United States Patent
Cha

(10) Patent No.: US 7,185,747 B2
(45) Date of Patent: Mar. 6, 2007

(54) ONE-WAY POWER TRANSMISSION UNIT, A FUSING UNIT DRIVING APPARATUS FOR DUPLEX PRINTER USING THE SAME, A METHOD FOR ONE WAY POWER TRANSMISSION, AND A METHOD FOR DRIVING A FUSING UNIT

(75) Inventor: Douk-soon Cha, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 134 days.

(21) Appl. No.: 11/004,916

(22) Filed: Dec. 7, 2004

(65) Prior Publication Data

US 2005/0241902 A1   Nov. 3, 2005

(30) Foreign Application Priority Data

May 3, 2004  (KR) ............... 10-2004-0030979

(51) Int. Cl.
  *F16D 41/00*  (2006.01)
  *F16D 11/14*  (2006.01)
  *G03G 15/00*  (2006.01)

(52) U.S. Cl. ............... 192/46; 192/69.81; 271/10.13; 399/361

(58) Field of Classification Search .............. 192/46, 192/69.81; 271/10.3, 10.13
See application file for complete search history.

(56) References Cited

U.S. PATENT DOCUMENTS

| | | | | |
|---|---|---|---|---|
| 479,192 A | * | 7/1892 | Leedle | .............. 192/46 |
| 1,849,212 A | * | 3/1932 | Winther | .............. 192/46 |
| 2,027,798 A | * | 1/1936 | Watt | .............. 192/48.6 |
| 2,607,253 A | * | 8/1952 | Gearhart | .............. 81/58 |
| 6,398,330 B1 | | 6/2002 | Chua et al. | |
| 6,672,581 B2 | * | 1/2004 | Lee et al. | .............. 271/164 |

FOREIGN PATENT DOCUMENTS

| | | |
|---|---|---|
| KR | 1993-023875 | 12/1993 |
| KR | 1998-0033285 | 7/1998 |

* cited by examiner

*Primary Examiner*—Richard M. Lorence
(74) *Attorney, Agent, or Firm*—Roylance, Abrams, Berdo & Goodman, L.L.P.

(57) ABSTRACT

A one-way power transmission unit has a force-fitting feature formed on at least one of an outer circumference of a boss of a driving member and an inner circumference of a boss hole of a latch member, for force-fitting the driving member into the latch member with a friction which is less than a load exerted to a driven member. A method of one-way power transmission includes force-fitting the driving member into the latch member with a friction which is less than a load exerted to a driven member. Since the latch member force-fits over the boss of the driving member, the driving member and the latch member rotate together with each other when the driving member switches from a driving force disconnection state to a driving force connection state, and thus, engagement of latch gears of the driving member and the latch member is reliably achieved. Accordingly, the time interval between switching from the driving force disconnection state to the connection state can be maintained to be essentially constant.

30 Claims, 5 Drawing Sheets

US 7,185,747 B2

ONE-WAY POWER TRANSMISSION UNIT, A FUSING UNIT DRIVING APPARATUS FOR DUPLEX PRINTER USING THE SAME, A METHOD FOR ONE WAY POWER TRANSMISSION, AND A METHOD FOR DRIVING A FUSING UNIT

CROSS-REFERENCE TO RELATED APPLICATIONS

This application claims the benefit under 35 U.S.C. §119 (a) of Korean Patent Application No. 2004-30979, filed on May 3, 2004, in the Korean Intellectual Property Office, the entire disclosure of which is incorporated herein by reference.

BACKGROUND OF THE INVENTION

1. Field of the Invention

The present invention relates to a power transmission unit, and more particularly, the present invention relates to a one-way power transmission unit, and a method, for transmitting only one of a forward driving force and a backward driving force from a driving part to a driven part, a fusing unit driving apparatus for a duplex printer using the same, and a method for driving a fusing unit.

2. Description of the Related Art

In a mechanism that transmits forward and backward driving forces from one driving part to at least two driven parts, if one driven part requires the forward driving force but the other driven part does not require it, the forward driving force has to be prevented from being transmitted to the other driven part.

A printing apparatus such as a laser beam printer generally uses the same motor to drive a fusing unit, a paper discharging unit, and a duplex unit. However, it is impossible for the fusing unit to rotate in a backward direction (a paper discharging direction is defined as a forward direction), and thus, when the paper discharging unit rotates in the backward direction to invert a paper sheet, the printing apparatus requires an additional device to prevent the backward driving force from being transmitted to the fusing unit.

A dedicated one-way power transmission unit has been provided to prevent the backward driving force from being transmitted from the motor to the fusing unit, and it is illustrated in FIG. 1 by way of an example.

Referring to FIG. 1, a general one-way power transmission unit 1 comprises a driving member 10, a driven member 20, and a latch member 30.

A boss 11 is disposed at a center portion of the driving member 10, and a first latch gear 12 is formed around the boss 11.

Another boss 21 is disposed at a center portion of the driven member 20. The driven member 20 is also provided with a pair of interference portions (not shown) formed at both sides of another boss 21.

The latch member 30 is provided with a second latch gear 31 corresponding to the first latch gear 12 of the driving member 10, and a pair of protrusions 32 and 32' to be located between the pair of interference portions of the driven member 20. The latch member 30 has a pair of inclined portions 33 and 33' disposed between the pair of protrusions 32 and 32'.

The latch member 30 is assembled with the boss 11 of the driving member 10 in a movable manner along the length of the boss 11. The latch member 30 is also assembled with the driven member 20 by the protrusions 32 and 32' and the interference portions.

When the driving member 10 rotates in a forward direction, the second latch gear 31 of the latch member 30 and the first latch gear 12 of the driving member 10 are engaged with each other, and higher portions of the inclined portions 33 and 33' of the latch member 30 are brought into contact with a front end of another boss 21. Accordingly, the latch member 30 and the driven member 20 rotate in the forward direction in relation to the rotation of the driving member 10.

When the driving member 10 rotates in a backward direction, the latch member 30 is slid from the engagement of the first and the second latch gears 12 and 31. As a result, the power is prevented from being transmitted to the driven member 20. At this time, in the sliding of the latch member 30 from the driving member 10, lower portions of the inclined portions 33 and 33' are brought into contact with the front end of another boss 21 of the driven member 20.

If the driving member 10 rotates back to the forward direction, the latch member 30 slightly rotates in the same direction as the driving member 10 and is moved toward the driven member 10 by the inter-operation between the inclined portions 33 and 33' of the latch member 30 and the front end of another boss 21 of the driven member 20 so that the first latch gear 12 and the second latch gear 31 are engaged with each other. As a result, the latch member 30 and the driven member 20 rotate in the forward direction together with the driving member 10.

As described above, assembling of the latch member 30 with the boss 11 of the driving member 10 is an important factor in the one-way power transmission unit 1 to connect and disconnect the driving force efficiently. That is, in order to achieve the efficient connection and disconnection of the driving force of the one-way power transmission unit, the latch member 30 has to be assembled with the boss 11 of the driving member 10 in a smoothly movable manner along the length of the boss 11, and there has to be a predetermined level of friction between the latch member 30 and the boss 11.

However, it is difficult to set an assembly gap between the latch member 30 and the boss 11 of the driving member 10 sufficient to satisfy the above assembly conditions. If the latch member 30 and the driving member 10 do not have precise sizes to satisfy the above conditions, it causes defect in connecting and disconnecting the driving force.

Especially, if the inner surface of the latch member 30 and the outer surface of the boss 11 of the driving member 10 are lubricated by a lubricating oil or the like, when the driving member 10 rotates back to the forward direction, the latch member 30 does not follow the rotation of the driving member 10 immediately and is delayed in rotating in the forward direction. Therefore, there is an irregular time interval in switching from a disconnection state of the driving force to a connection state.

For example, when the general one-way power transmission unit is applied to the fusing unit driving apparatus of the duplex printer, the delay in re-driving the fusing unit causes malfunctions such as a paper jam and a paper crumple.

SUMMARY OF THE INVENTION

The present invention has been developed in order to solve the above problems in the related art. One of the aspects of the present invention is to provide a one-way power transmission unit and method which are capable of maintaining essentially constant a time interval between switching from a disconnection state of a driving force to a connection state, and thus achieve a more reliable performance when connecting and disconnecting.

Another aspect of the present invention is to provide a fusing unit driving apparatus, for a duplex printer which employs the one-way power transmission unit with the above feature, and a method for driving a fusing unit, which prevent a malfunction such as a paper jam in the fusing unit.

An embodiment of the present invention provides a one-way power transmission unit which has force-fitting means formed on one of an outer circumference of a boss of a driving member and an inner circumference of a boss hole of a latch member, for force-fitting the driving member into the latch member with a friction which is less than a load exerted to a driven member.

According to an embodiment of the present invention, force-fitting means comprises at least one rib formed on the outer circumference of the boss of the driving member or at least one rib formed on the inner circumference of the boss hole.

According to an embodiment of the present invention, since the latch member force-fits over the boss of the driving member, the driving member and the latch member rotate together with each other when the driving member switches from a driving force disconnection state to a driving force connection state, and thus, engagement of latch gears of the driving member and the latch member is reliably achieved. Accordingly, the time interval in switching from the driving force disconnection state to the connection state can be constantly maintained.

According to one embodiment of the present invention, a one-way power transmission unit comprises: a driving member having a boss; a latch member having a boss hole into which the boss is inserted; and a driven member. Three ribs are formed on an outer circumference of the boss at the same interval of approximately 120°, for force-fitting the boss into the boss hole with a friction which is less than a load exerted to the driven member.

According to another embodiment of the present invention, a one-way power transmission unit comprises: a driving member having a boss; a latch member having a boss hole into which the boss is inserted; and a driven member. Three ribs are formed on an inner circumference of the boss hole at the same interval of approximately 120°, for force-fitting the boss into the boss hole with a friction which is less than a load exerted to the driven member.

According to another embodiment of the present invention, a one-way power transmission unit comprises: a driving member including a boss formed at a center portion and a first latch gear formed around the boss, the driving member being rotated in a forward direction and a backward direction by a driving part; a latch member including a boss hole assembled with the boss in a movable manner along the length of the boss, a second latch gear selectively engaged with the first latch gear, a pair of protrusions formed on a backside surface of the second latch gear, and a pair of inclined portions disposed between the pair of protrusions; a driven member including a boss formed in a center portion and contacting the inclined portions and a pair of interference portions disposed at opposite sides of the boss, the driven member assembled with the latch member; and at least one force-fit rib formed on a sliding surface of either the boss of the driving member or the boss hole of the latch member, for force-fitting the boss hole of the latch member over the boss of the driving member.

According to another embodiment of the invention, a friction occurring between the boss of the driving member and the boss hole of the latch member due to the presence of the force-fit rib is less than a load exerted to the driven member. Accordingly, when the driving member rotates in a backward direction, the driving force is not transmitted to the driven member without delay.

According to another embodiment of the invention, a force-fit rib may be formed on an outer circumference of the boss of the driving member or an inner circumference of the boss hole of the latch member, and preferably, three force-fit ribs are formed at the same interval of approximately 120°.

According to another embodiment of the invention, the force-fit rib is formed on the outer circumference of the boss of the driving member, it has an upwardly-inclined surface along a direction in which the latch member fits over the boss of the driving member. The inclined surface has a length smaller than one half the force-fit rib.

According to another embodiment of the invention, the driving member and the driven member each may have a gear portion formed on an outer circumference thereof.

According to another embodiment of the invention, a fuser driving apparatus is provided for a duplex printer, which comprises a motor as a driving source; and a gear train for transmitting a forward driving force and a backward driving force from the motor to the fuser and a paper discharge unit. The gear train comprises one-way power transmission unit which transmits the forwarding driving force to the fuser but does not transmit the backward driving force to the fuser.

According to another embodiment of the invention, a one-way power transmission unit comprises: a driving member including a gear portion formed on an outer circumference, a boss formed at a center portion, and a first latch gear formed around the boss, the driving member being rotated by the motor in forward and backward directions; a latch member including a boss hole assembled with the boss in a movable manner along the length of the boss, a second latch gear selectively engaged with the first latch gear, a pair of protrusions formed on a backside surface of the second latch gear, and a pair of inclined portions disposed between the protrusions; a driven member including a gear portion formed on an outer circumference, a boss formed at a center portion and contacting the inclined portions, and a pair of interference portions disposed at opposite sides of the boss, the driven member being assembled with the latch member and connected with the fuser; and at least one rib formed on a sliding surface of either the boss of the driving member or the boss hole of the latch member, the rib facilitating a force-fitting of the boss of the driving member into the boss hole of the latch member.

According to another embodiment of the present invention, a friction occurring between the boss of the driving member and the boss hole of the latch member due to the presence of the rib is less than a load exerted to the fuser.

BRIEF DESCRIPTION OF THE DRAWING FIGURES

The above and other features and advantages of the present invention will become more apparent by describing in detail exemplary embodiments thereof with reference to the attached drawings in which.

It will be understood that like reference numerals refer to like features and structures throughout the drawing figures.

DETAILED DESCRIPTIONS OF THE EXEMPLARY EMBODIMENTS

Figure 1:
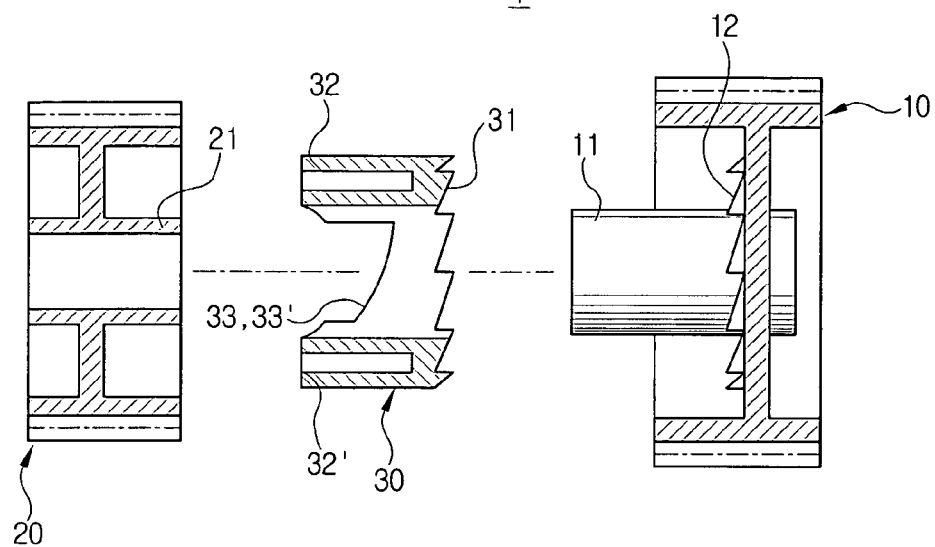
FIG. 1 is an exploded cross section view showing a general one-way power transmission unit by way of one example.
Figure 2:
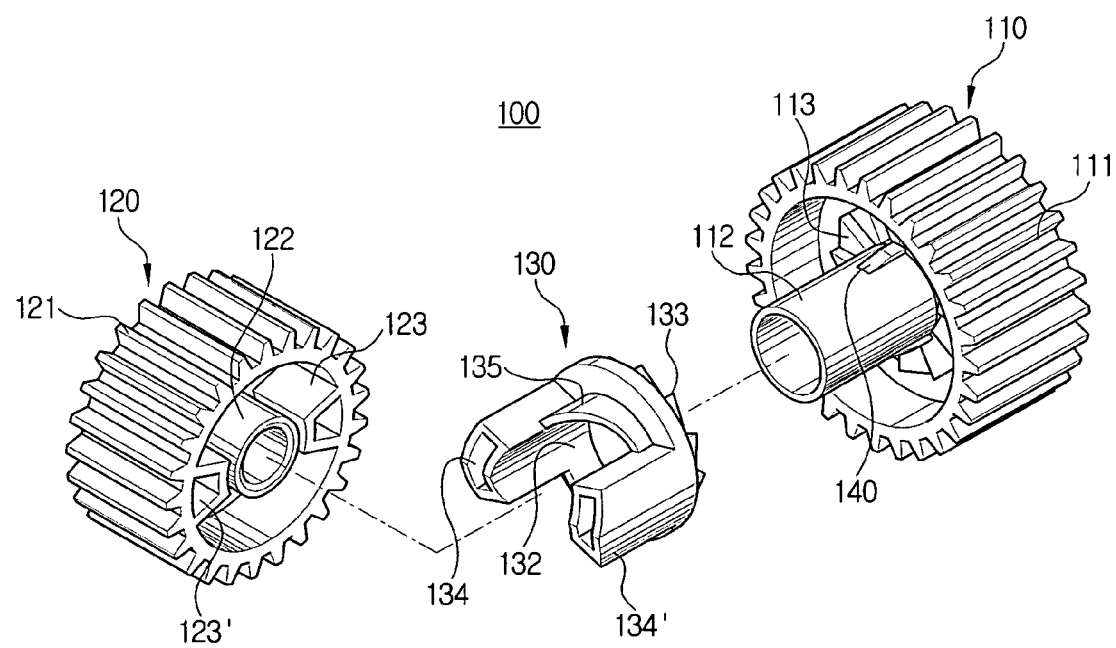
FIG. 2 is an exploded perspective view showing a one-way power transmission unit according to an embodiment of the present invention.

FIG. 2 is an exploded perspective view showing a one-way power transmission unit 100 according to an embodiment of the present invention. The one-way power transmission unit 100 comprises a driving member 110, a driven member 120, a latch member 130, and a force-fit rib 140 which is one of the features of an embodiment of the present invention.

As shown in FIG. 2, the driving member 110 comprises a gear 111 formed around an outer circumference, a boss 112 formed at a center portion, and a latch gear 113 disposed around the boss 112. The gear 111 may be used for a power transmission mechanism using gear engagement, but it should not be construed as limiting. For example, the gear 111 may be omitted when other types of power transmission mechanism such as a belt, is used.

The driven member 120 comprises a gear 121 formed around an outer circumference, a boss 122 formed at a center portion, and a pair of interference portions 123 and 123' disposed at opposite sides of the boss 122. The driven member 120 may be assembled with a driven body (not shown) or connected with the driven body by a gear or a belt. Like in the driving member 110, the gear 121 may be employed or omitted depending on the type of a power transmission mechanism in use.

Figure 5A:
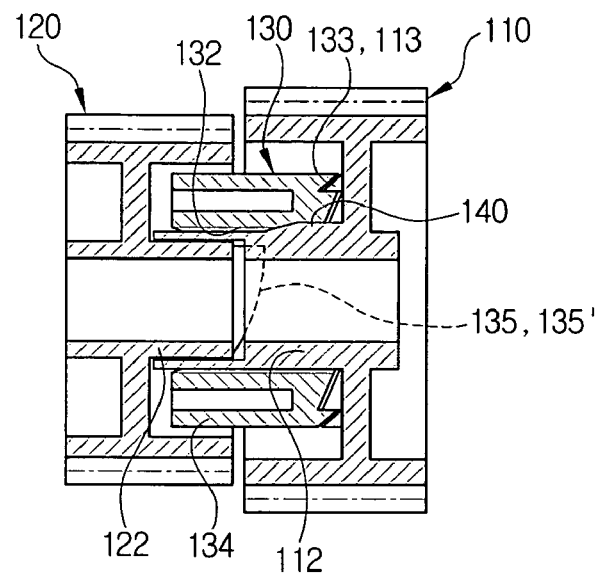
FIGS. 5A and 5B are cross sectional views respectively showing the one-way power transmission unit according to an embodiment of the present invention in a connection state and a disconnection state.
Figure 5B:
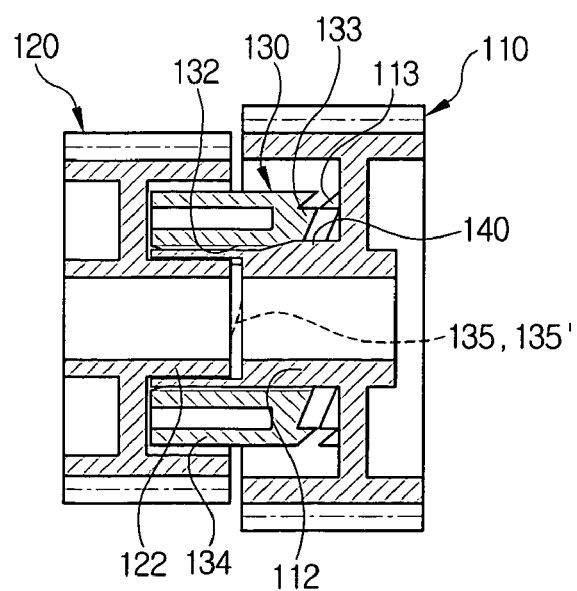

As shown in FIGS. 2, 5A, and 5B, the latch member 130 comprises a boss hole 132, a second latch gear 133 selectively engaged with the first latch gear 113, a pair of protrusions 134 and 134' formed on a backside of the second latch gear 133, and a pair of inclined portions 135 and 135' each having a predetermined inclination and being disposed between the pair of protrusions 134 and 134'. The pair of protrusions 134 and 134' oppose to each other, and the inclined portion 135 and 135' are inclined in opposite directions with respect to each other.

The latch member 130 is assembled with the driving member 110 in a manner that fits the boss hole 132 over the boss 112 of the driving member 110 in a slidably movable manner along the length of the boss 112. The latch member 130 is assembled with the driven member 120 by the structural characteristics of the protrusions 134 and 134' and the interference portions 123 and 123'. The first latch gear 113 of the driving member 110 and the second latch gear 133 of the latch member 130 are structured so that they are engaged with each other when the driving member 110 rotates in a forward direction, while being slid from the engagement when the driving member 110 rotates in a backward direction.

Figure 3:
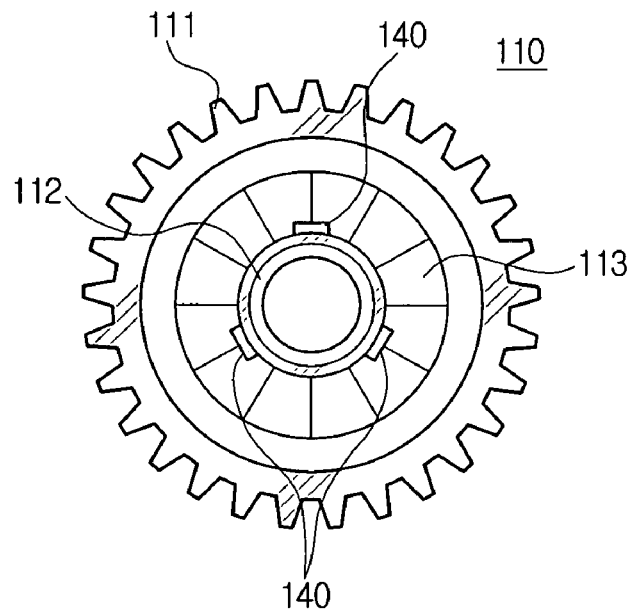
FIG. 3 is a view showing the driving member of the one-way power transmission unit of FIG. 2.
Figure 4:
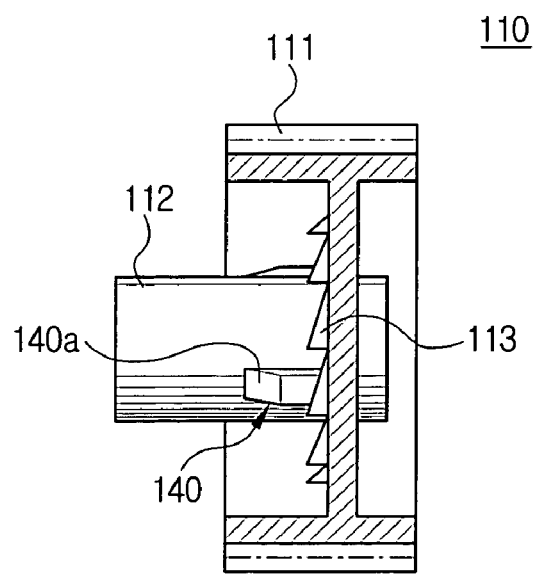
FIG. 4 is a side section view of FIG. 3.

As shown in FIGS. 2 to 4, the force-fit rib 140 is formed around the outer circumference of the boss 112 of the driving member 110, for facilitating the force-fitting of the boss hole 132 of the latch member 130 over the boss 112 of the driving member 110. At this time, a friction occurs between the boss 112 and the boss hole 132 due to the presence of the rib 140, and the friction is less than a load exerted to the driven member 120.

According to an embodiment of the invention, one force-fit rib 140 is sufficient to achieve an aspect of such an embodiment of the present invention. According to another embodiment, three ribs 140 may be arranged around the outer circumference of the boss 112 at the same interval of approximately 120°. According to other embodiments, the number of the force-fit ribs 140 may be, for example, four or more.

As shown in FIG. 4, the force-fit rib 140 is disposed on the outer circumference of the boss 112, and has an upwardly-inclined surface 140a along the direction where the latch member 130 force-fits over the boss 112. The length of the inclined surface 140a is shorter than one-half the rib 140. The inclined surface 140a facilitates the force-fitting of the boss hole 132 of the latch member 130 over the boss 112 of the driving member 110.

Although in this embodiment the force-fit rib 140 has a substantially rectangular shape as shown in FIG. 4, this should not be considered as limiting. That is, the force-fit rib 140 can take various formations if it facilitates the force-fitting of the boss hole 132 of the latch member 130 over the boss 112 of the driving member 110.

FIGS. 5A and 5B are cross section views showing the one-way power transmission unit in a connection state for a power transmission and a disconnection state, respectively, according to an embodiment of the present invention.

In the connection state as shown in FIG. 5A, the driving member 110 rotates in the forward direction, the second latch gear 133 of the latch member 130 is engaged with the first latch gear 113 of the driving member 110, and the latch member 130 is assembled with the driven member 120 in a manner that fits the protrusions 134 and 134' of the latch member 130 into spaces between the interference portions 123 and 123'. At this time, higher portions of the inclined portions 135 and 135' of the latch member 130 are brought into contact with a front end of the boss 122 of the driven member 120. Accordingly, the forward driving force is transmitted from the driving member 110 to the driven member 120 through the latch member 130.

When the driving member 110 rotates in the backward direction, the latch member 130 is slid from the engagement of the first latch gear 113 of the driving member 110 with the second latch gear 133 of the latch member 130 as shown in FIG. 5B. Accordingly, the backward driving force of the driving member 110 is not transmitted to the driven member 120. While the latch member 130 is pushed toward the driven member 120, it slightly rotates by the inter-operation between the inclined portion 135 and 135' and the front end of the boss 122 of the driven member 120, and is spaced away from the driving member 110 by a predetermined distance, with the lower portions of the inclined portion 135 and 135' contacting with the boss 122.

When the driving member 110 rotates back to the forward direction, the latch member 130 slightly rotates in the rotating direction of the driving member 110 due to a predetermined level of the friction occurring between the outer circumference of the boss 112 of the diving member 110 and the inner surface of the boss hole 132 of the latch member 130. At this time, because the inclined portions 135 and 135' of the latch member 130 are in contact with the boss 122 of the driven member 120, the latch member 130 is moved toward the driving member 110, and thus the second latch gear 133 of the latch member 130 is engaged with the first latch gear 113 of the driving member 110 as shown in FIG. 5A. Accordingly, the forward driving force of the driving member 110 is transmitted to the driven member 120 through the latch member 130.

Since the boss hole 132 of the latch member 130 securely force-fits over the boss 112 of the driving member 110 due to the rib 140 formed on the outer circumference of the boss 112, the latch member 130 rotates together with the driving member 110 when the driving member 110 rotates back to the forward direction to transmit the driving force. Accordingly, the engagement of the latch member 130 with the driving member 110 is accomplished always at the same time.

When the driving member 110 rotates in the backward direction in the above connection state, because the load exerted to the driven member 120 is greater than the friction caused by the force-fitting, driving power blockage by the configurations of the first and the second latch gears 113 and 133, can constantly occur.

Figure 6:
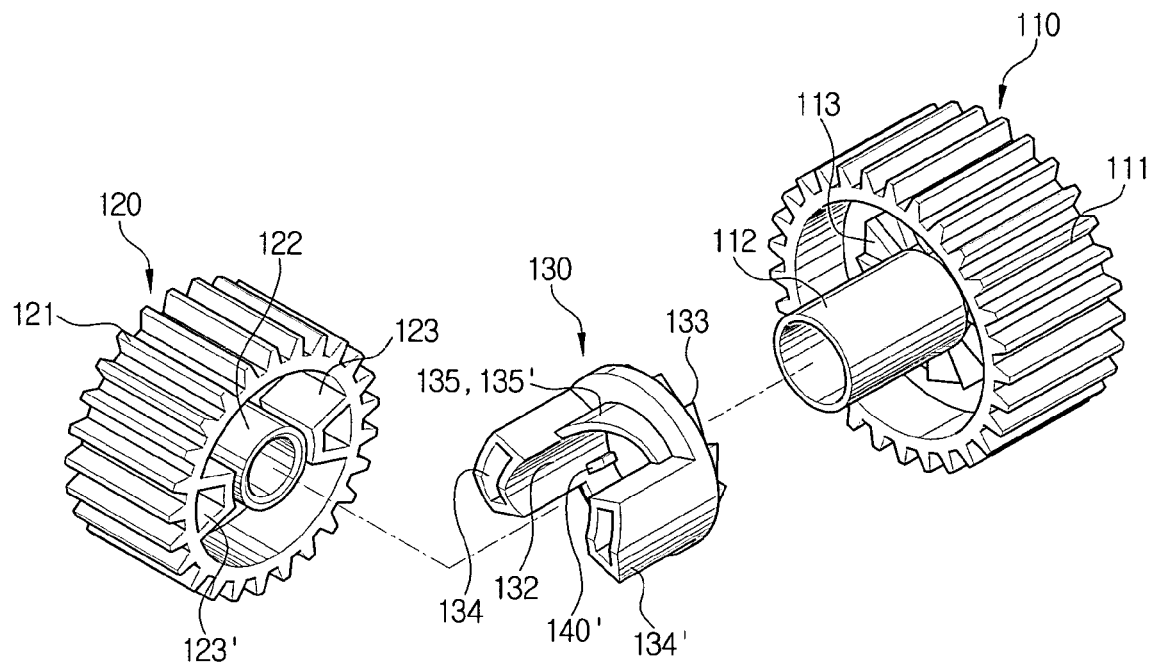
FIG. 6 is an exploded perspective view showing a one-way power transmission unit according to another embodiment of the present invention.
Figure 7:
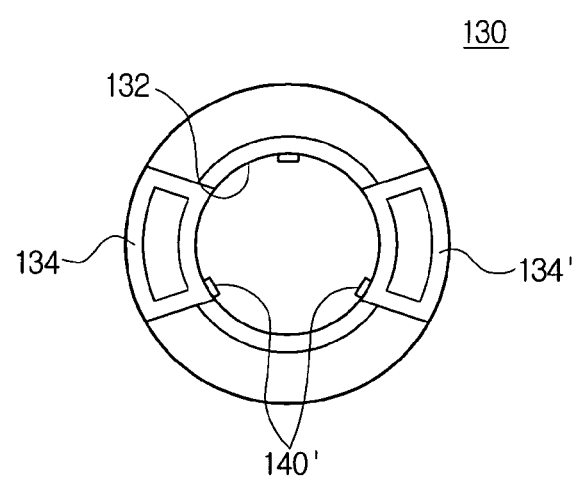
FIG. 7 is a view showing the latch member of the one-way power transmission unit of FIG. 6.

FIG. 6 is an exploded perspective view showing a one-way power transmission unit according to another embodiment of the present invention, and FIG. 7 is a view showing the latch member of the one-way power transmission unit according to another embodiment of the present invention.

The one-way power transmission unit according to another embodiment has a force-fit latch 140' is formed on an inner circumference of the boss hole 132 of the latch member 130. Like reference numerals are assigned to the like elements, and thus detailed descriptions are omitted.

According to yet another embodiments, as means for force-fitting the boss hole 132 of the latch member 130 over the boss 112 of the driving member 110, the force-fit ribs 140 and 140' respectively formed on the outer circumference of the boss 112 and on the inner circumference of the boss hole 132 were provided. However, this should not be considered as limiting. According to yet other embodiment, various means, which can force-fit the latch member 130 over the driving member 110 with a predetermined friction which is less than the load exerted to the driven member 120, may be implemented without departing from the teaching of the above-described embodiments of the invention.

Figure 8:
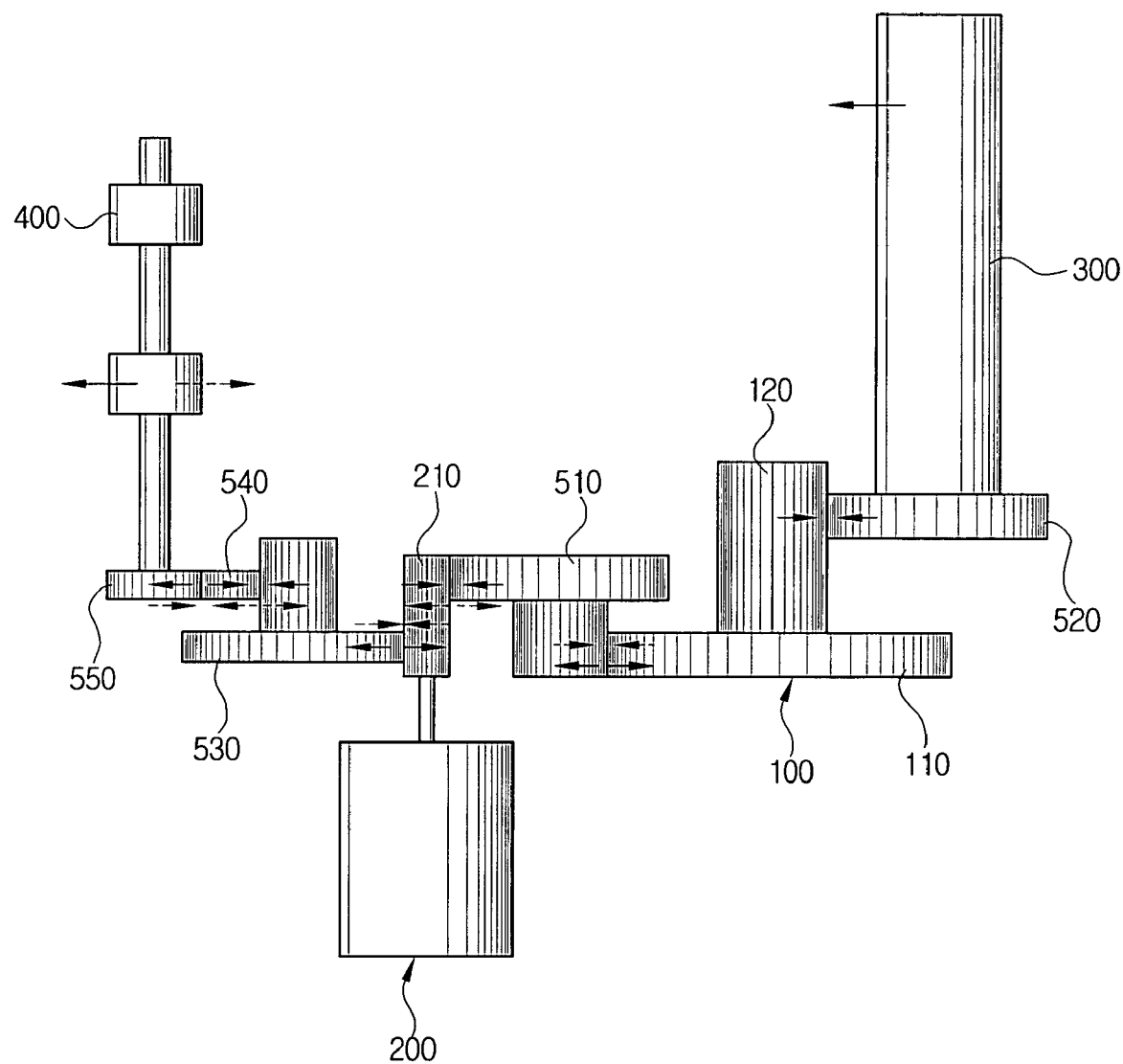
FIG. 8 is a schematic view showing a fusing unit driving apparatus for a duplex printer using a one-way power transmission unit according to an embodiment of the present invention.

FIG. 8 is a view showing an embodiment of a fusing unit driving apparatus for a duplex printer using the one-way power transmission unit according to an embodiment of the present invention.

Reference numerals indicate elements as follows: one-way power transmission unit 100, driving motor 200, fusing roller 300, paper discharging roller 400, and gear train 510 to 550. Hereinafter, the forward rotation of the driving motor 200 is referred to as a clockwise direction rotation and the backward rotation as a counter clockwise direction rotation.

The one-way power transmission unit 100 is disposed between a first gear 510 and a second gear 520, and has the same structure and features as described above.

The first gear 510 is engaged with a driving gear 210 connected to a shaft of the driving motor 200, and the second gear 520 is assembled with the fusing roller 300. The driving member 110 of the one-way power transmission unit 100 is engaged with the first gear 510, and the driven member 120 is engaged with the second gear 520.

The driving force of the driving motor 200 is transmitted to the paper discharging roller 400 through the driving gear 210, a third gear 530, a fourth gear 540, and a fifth gear 550.

When the driving motor 200 rotates in the forward direction, the forward driving force of the driving motor 200 is transmitted to the fusing roller 300 through the driving gear 210, the first gear 510, the driving member 110 of the one-way power transmission unit 100, the driven member 120 and the second gear 520 so that the fusing roller 300 rotates in a paper discharging direction. The forward driving force of the driving motor 200 is transmitted to the fusing roller 300 by the operation of the one-way power transmission unit 100 along the solid-lined arrows.

Also, the forwarding driving force of the driving motor 200 is transmitted to the paper discharging roller 400 through the driving gear 210, the third gear 530, the fourth gear 540, and the fifth gear 550. Accordingly, the paper discharging roller rotates in the paper discharging direction along the solid-lined arrows to thereby convey a paper.

Meanwhile, when it is necessary to invert the paper sheet in a duplex printing mode, the driving motor 200 rotates in the backward direction. The backward driving force of the driving motor 200 is transmitted to the driving member 110 of the one-way power transmission unit 100 through the driving gear 210 and the first gear 510. At this time, the backward rotation of the driving member 110 results in the driving force not being transmitted to the driven member 120 by the operation of the latch member and only the driving member 110 being idly rotated. Accordingly, the fusing roller 300 does not rotate.

However, the backward driving force of the driving motor 200 is transmitted to the paper discharging roller 400 through the driving gear 210, the third gear 530, the fourth gear 540, and the fifth gear 550, so that the paper discharging roller 400 rotates in the opposite direction to the paper discharging direction to invert the paper sheet.

When the inverted paper sheet enters into a paper conveyance path, the driving motor 200 rotates back to the forward direction. The forward driving force of the driving motor 200 is transmitted to the fusing roller 300 through the one-way power transmission unit 100, thereby rotating the fusing roller 300 and also rotating the paper discharging roller 400 in the paper discharging direction.

In the above exemplary process of transmitting the driving force in the fusing unit driving apparatus, since the one-way power transmission switches from the driving force disconnection state to the driving force connection state accurately and without delay, malfunction such as a paper jam, which is caused by the irregular time interval in switching from the disconnection state to the connection state, can be prevented According to an embodiment of the present invention, since the latch member 130 force-fits over the boss 112 of the driving member 110, the latch member 130 and the driven member 120 rotate together with the driving member 110 when transmitting the driving force. Accordingly, the engagement of the latch gears 113 and 133 is reliably achieved, and thus, the driving force is transmitted without delay.

That is, the reliability of the driving force connection and disconnection can be guaranteed. Accordingly, when the one-way power transmission unit is applied to the fusing unit driving apparatus for a duplex printer, the fusing unit returns back to the driving operation without delay, which prevents the malfunction such as a paper jam While the invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A one-way power transmission unit comprising:
a driving member comprising a boss;
a latch member comprising a boss hole configured to accommodate the boss therein;
a driven member configured to engage with the latch member;
and a force-fitting member disposed on at least one of an outer circumference of the boss and an inner circumference of the boss hole;
wherein the force fitting member facilitates fitting of the driving member into the latch member with a frictional force between the boss and the boss hole, the frictional force being less than a load exerted to the driven member.

2. The one-way power transmission unit as claimed in claim 1, wherein the force-fitting member comprises at least one rib formed on the outer circumference of the boss.

3. The one-way power transmission unit as claimed in claim 1, wherein the force-fitting member comprises at least one rib formed on the inner circumference of the boss hole.

4. A one-way power transmission unit comprising:
a driving member comprising a boss;
a latch member comprising a boss hole configured to accommodate the boss therein;
a driven member configured to engaged with the latch member; and
three ribs disposed on an outer circumference of the boss at intervals of approximately 120°;
wherein the three ribs are configured to facilitate force-fitting the boss into the boss hole with a frictional force, the frictional force being less than a load exerted to the driven member.

5. A one-way power transmission unit comprising:
a driving member comprising a boss;
a latch member comprising a boss hole configured to accommodate the boss therein; and
a driven member configured to engage with the latch member; and
three ribs disposed on an inner circumference of the boss hole at intervals of approximately 120°;
wherein the three ribs are configured to facilitate force-fitting the boss into the boss hole with a frictional force, the frictional force being less than a load exerted to the driven member.

6. A one-way power transmission unit for transmitting one of a forward rotational driving force and a backward rotational driving force from a driving part to a driven part, the unit comprising:
a driving member comprising a first boss formed at a center portion of the driving member and a first latch gear formed around the boss, the driving member being rotated in a forward direction and a backward direction by the driving part;
a latch member comprising:
a boss hole configured to accommodate the first boss therein in a movable manner along the length of the first boss;
a second latch gear selectively engaged with the first latch gear;
a pair of protrusions disposed on a backside surface of the second latch gear; and
a pair of inclined portions disposed between the pair of the protrusions;
a driven member configured to engage with the latch member, the driven member comprising:
a second boss formed in a center portion of the driven member and contacting the pair of the inclined portions; and
a pair of interference portions disposed at opposite sides of the second boss; and
at least one force-fit rib disposed on at least one of an outer circumference of the first boss and an inner circumference of the boss hole, the at least one force-fit rib is configured to facilitate force-fitting the first boss into the boss hole.

7. The one-way power transmission unit as claimed in claim 6, wherein a friction occurring between the first boss and the boss hole is less than a load exerted to the driven member.

8. The one-way power transmission unit as claimed in claim 6, wherein the at least one force-fit rib is disposed on the outer circumference of the first boss.

9. The one-way power transmission unit as claimed in claim 6, wherein three force-fit ribs are disposed on the outer circumference of the first boss at intervals of approximately 120°.

10. The one-way power transmission unit as claimed in claim 6, wherein the at least one force-fit rib comprises an upwardly-inclined surface along a direction in which the latch member fits over the first boss.

11. The one-way power transmission unit as claimed in claim 10, wherein a length of the upwardly-inclined surface is less than one half of a length of the at least one force-fit rib.

12. The one-way power transmission unit as claimed in claim 6, wherein at least one of the driving member and the driven member comprises a gear portion on an outer circumference thereof.

13. The one-way power transmission unit as claimed in claim 6, wherein the at least one force-fit rib is disposed on the inner circumference of the boss hole.

14. The one-way power transmission unit as claimed in claim 6, wherein three force-fit ribs are disposed on the inner circumference of the boss hole at intervals of approximately 120°.

15. The one-way power transmission unit as claimed in claim 6, wherein the driving member and the driven member each comprises a gear portion on an outer circumference thereof.

16. A fuser driving apparatus for a duplex printer comprising:
a motor configured to supply a forward driving force and a backward driving force;
a drive train transmitting a forward driving force from the motor to a fuser; and
a one-way power transmission unit disposed in the drive train;
wherein the power transmission unit transmits the forwarding driving force from the motor to the fuser without transmitting the backward driving force from the motor to the fuser; and
the one-way power transmission unit comprises:
a driving member comprising a first boss disposed at a center portion of the driving member, and a first latch gear disposed around the first boss, the driving member is configured to be rotated by the forward driving force of the motor in a forward direction and by the backward driving force of the motor in a backward direction;

a latch member comprising a boss hole configured to accommodate the first boss therein in a movable manner along the length of the first boss, a second latch gear selectively engaged with the first latch gear, a pair of protrusions disposed on a backside surface of the second latch gear, and a pair of inclined portions disposed between the protrusions;

a driven member comprising a second boss disposed at a center portion of the driven member and configured to contact the inclined portions, and a pair of interference portions disposed at opposite sides of the second boss; and at least one force-fit rib disposed on at least one of an outer circumference of the first boss and an inner circumference of the boss hole;

wherein, when the motor supplies the forward driving force, the at least one force-fit rib facilitates a force-fitting of the first boss into the boss hole; and the first latch gear engages the second latch gear, and the driven member transmits the forwarding driving force from the motor to the fuser.

17. The fuser driving apparatus as claimed in claim 16, wherein a friction occurring between the first boss and the boss hole of the latch member is less than a load exerted to the fuser.

18. The fuser driving apparatus as claimed in claim 16, wherein the at least one force-fit rib is disposed on the outer circumference of the first boss.

19. The fuser driving apparatus as claimed in claim 16, wherein three force-fit ribs are disposed on the outer circumference of the first boss at intervals of approximately 120°.

20. The fuser driving apparatus as claimed in claim 16, wherein the at least one force-fit rib comprises an upwardly-inclined surface along a direction in which the latch member fits over the first boss.

21. The fuser driving apparatus as claimed in claim 20, wherein a length of the inclined surface is less than one half of a length of the force-fit rib.

22. The fuser driving apparatus as claimed in claim 16, wherein the at least one force-fit rib is disposed on the inner circumference of the boss hole.

23. The fuser driving apparatus as claimed in claim 16, wherein three ribs are disposed on the inner circumference of the boss hole at intervals of approximately 120°.

24. The fuser driving apparatus as claimed in claim 16, wherein:

the drive train comprises a gear train;

the driving member comprises a first gear portion disposed on an outer circumference thereof; and the driven member comprises a second gear portion disposed on an outer circumference thereof.

25. A one-way power transmission unit comprising:

a driving member comprising a boss;

a latch member comprising an interior surface, wherein at least a portion of the interior surface comprises a boss hole configured to accommodate the boss therein;

a driven member configured to engage with the latch member;

wherein, when transmitting power from the driving member to the driven member, the boss is fitted into the boss hole with a first frictional force between the boss and the portion of the interior surface of the boss hole, and when not transmitting power from the driving member to the driven member, the boss is fitted into the boss hole with a second fictional force between the boss and the portion of the interior surface of the boss hole, the second frictional force being less than the first frictional force.

26. A one-way power transmission unit comprising:

a driving member comprising a boss;

a latch member comprising an interior surface, wherein at least a portion of the interior surface comprises a boss hole configured to accommodate the boss therein;

a driven member configured to engage with the latch member;

and a force-fitting member disposed on at least one of an outer circumference of the boss and an inner circumference of the boss hole;

wherein, when transmitting power from the driving member to the driven member, the boss is fitted into the boss hole with a frictional force, the frictional force comprising a friction between at least a portion of an outer surface of the force-fitting member and at least a portion of a surface of a corresponding one of the outer circumference of the boss and the inner circumference of the boss hole.

27. The one way power transmission unit as claimed in claim 26, wherein the force fitting member comprises at least one force-fit rib.

28. The one way power transmission unit as claimed in claim 26, wherein the force fitting member comprises a plurality of force-fit ribs spaced at essentially equal intervals therebetween.

29. A method for one-way power transmission in a unit comprising: a driving member comprising a boss; a latch member comprising an interior surface, at least a portion of the interior surface comprising a boss hole configured to accommodate the boss therein; and a driven member configured to engaged with the latch member; the method comprising:

driving the driving member in a forward direction or a backward direction;

when driving the driving member in the forward direction:

fitting the boss into the boss hole with a first frictional force between the boss and the portion of the interior surface of the boss hole;

engaging the driven member with the latch member, thereby exerting a load to the driven member; and transmitting power from the driving member to the driven member; and when driving the driving member in the backward direction:

fitting the boss into the boss hole with a second frictional force between the boss and the portion of the interior surface of the boss hole;

disengaging the driven member from the latch member; and discontinuing the transmitting of the power from the driving member to the driven member;

wherein the second frictional force is less than the first frictional force.

30. A method for driving a fuser comprising:

rotating a driving member by a forward driving force in a forward direction or by a backward driving force in a backward direction, the driving member comprising a first boss disposed at a center portion of the driving member;

selectively engaging or disengaging a latch member with the driving member, the latch member comprising:
  a boss hole configured to accommodate the first boss therein in a movable manner along the length of the first boss;
  a pair of protrusions disposed around the boss hole; and a pair of inclined portions disposed between the protrusions; and
transmitting the forwarding driving force to a fuser via a driven member when the latch member and the driving member are engaged, the driven member comprising:
  a second boss disposed at a center portion of the driven member and configured to contact the inclined portions, and
  a pair of interference portions disposed at opposite sides of the second boss;
wherein the selectively engaging the latch member with the driving member comprises force-fitting the first boss into the boss hole at a first friction between the first boss and the boss hole, and
the selectively disengaging the latch member with the driving member comprises fitting the first boss into the boss hole at a second friction between the first boss and the boss hole, the second friction being less than the first friction.

* * * * *